United States Patent
Allen et al.

(10) Patent No.: US 6,845,617 B1
(45) Date of Patent: Jan. 25, 2005

(54) CENTER HOUSING DESIGN FOR ELECTRIC ASSISTED TURBOCHARGER

(75) Inventors: John F. Allen, El Segundo, CA (US); Gerhard E. Delf, New Baltimore, MI (US)

(73) Assignee: Honeywell International Inc, Morristown, NJ (US)

( * ) Notice: Subject to any disclaimer, the term of this patent is extended or adjusted under 35 U.S.C. 154(b) by 0 days.

(21) Appl. No.: 10/743,685

(22) Filed: Dec. 20, 2003

(51) Int. Cl.$^7$ .................... F02B 33/44; F02B 37/00; F02C 7/06
(52) U.S. Cl. .................... 60/607; 123/565; 310/154.06; 310/156.35
(58) Field of Search .................... 60/607, 608; 123/565; 310/154.06, 156.35, 134, 142, 149

(56) References Cited

U.S. PATENT DOCUMENTS

| | | | | |
|---|---|---|---|---|
| 4,823,040 A | * | 4/1989 | Oudet | .................... 310/156.35 |
| 4,884,406 A | * | 12/1989 | Kawamura | .................... 60/608 |
| 5,661,354 A | * | 8/1997 | Burtis | .................... 310/154.06 |
| 5,870,894 A | | 2/1999 | Woollenweber et al. | |
| 6,085,527 A | * | 7/2000 | Woollenweber et al. | ...... 60/607 |
| 6,145,314 A | | 11/2000 | Woollenweber et al. | |
| 6,449,950 B1 | | 9/2002 | Allen et al. | |
| 6,571,558 B2 | * | 6/2003 | Finger et al. | .................. 60/607 |

\* cited by examiner

Primary Examiner—Sheldon J Richter
(74) Attorney, Agent, or Firm—Ephraim Starr; Chris James

(57) ABSTRACT

An electric assisted turbocharger has an electric motor with a stator and a rotor that is coupled to a turbocharger shaft carried by a bearing assembly. The stator has a left-hand winding and a right hand-winding each projecting axially outwardly therefrom. The winds each extend a different distance radially along the motor (and are thus asymmetrical with respect to one another), thereby forming a radial gap along an axial end of the stator. The so-formed stator is disposed within a motor housing and together, the stator and motor housing, facilitate placement center housing axial end therein to minimize turbocharger axial length. The rotor is configured to prevent migration of oil into the motor housing, to improve dynamic balance, and comprises an integral thrust washer for placement against the bearing assembly.

6 Claims, 2 Drawing Sheets

CENTER HOUSING DESIGN FOR ELECTRIC ASSISTED TURBOCHARGER

FIELD OF THE INVENTION

This invention relates generally to the field of turbochargers and, more particularly, to a center housing design for packaging an electric motor in an electric assisted turbocharger.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the turbine housing. The exhaust gas-driven turbine is mounted onto one end of a shaft that is common to a radial air compressor mounted onto an opposite end of that shaft. Thus, rotary action of the turbine also causes the air compressor to spin within a compressor housing of the turbocharger that is separate from the turbine housing. The spinning action of the air compressor causes intake air to enter the compressor housing and be pressurized or boosted a desired amount before it is mixed with fuel and combusted within the engine combustion chamber.

The turbocharger turbine section comprises a turbine wheel, a wheel heat shroud, and a turbine housing. The turbine inlet is positioned along an outer diameter portion of the turbine housing. The turbine is a centripetal radial, or mixed inflow device in that exhaust gas flows inward, past the wheel blades, and exits at the center of the housing's diameter. Expanded engine exhaust gas is directed through the exhaust gas manifold into the turbine housing. The exhaust gas pressure and the heat energy extracted from the gas causes the turbine wheel and attached shaft to rotate, which drives the compressor wheel.

The turbocharger compressor section comprises a compressor wheel, a backplate, and a compressor housing. The compressor inlet is positioned at the center of the compressor housing diameter. It is a centrifugal, or radial-outflow device in that the air flows outward, past the wheel blades, and exits at the outer diameter of the housing. The rotating compressor wheel draws ambient air through the engine's air filtration system. The blades of the wheel accelerate and expel the air into the compressor housing where it is compressed and directed through ducting to the engine intake manifold.

A central housing and rotating assembly supports the compressor and turbine wheel shaft in a bearing assembly or system. Seals separate the center housing from both the turbine and compressor sections.

Because the rotary action of the turbine is dependent upon the heat and volumetric flow of exhaust gas exiting the engine, turbochargers are often of reduced effectiveness when the engine to which they are coupled is run at a low speed. The reduced effectiveness is often labeled turbo-lag. In order to overcome turbo-lag when the heat and volumetric flow of exhaust gas is low, an electric motor is known for rotating the shaft and inducing the compressor to spin.

However, adding an electric motor to a turbocharger often entails adding length to the turbocharger. The additional length of the turbocharger corresponds to the length of the electric motor. It is, therefore, desired that a turbocharger construction be devised that combines the features of an electric assisted turbocharger while minimizing the additional length added by the electric motor.

Additionally, the electric motor placed within the turbocharger is vulnerable to oil contamination. Therefore, a need exists for preventing oil contamination of the electric motor. Finally, the presence of the electric motor and its rotor assembly that rotates at very high speeds (upwards of 200,000 revolutions per minute), creates balancing and stability problems. Therefore, a need exists for a turbocharger design comprising a rotor assembly that is balanced and stable during turbocharger operation.

SUMMARY OF THE INVENTION

An electric assisted turbocharger, constructed according to principles of this invention, comprises a turbine and a compressor connected together by a common turbocharger shaft. The compressor is disposed within a compressor housing, that is coupled to a motor housing. Positioned inside of the motor housing is an electric motor having a stator and a rotor. The rotor is coupled to the shaft. A center housing is coupled to the motor housing, and a bearing assembly that carries the shaft is positioned inside of the center housing.

The stator of the electric motor has a left-hand winding and a right hand winding that each project outwardly from opposite axial sides of the stator. The left-hand winding extends radially along the stator a distance greater than does the right-hand winding, thereby forming a radial gap between the rotor and the stator right-hand winding. The center housing includes an axial end portion that extends into the radial gap for purposes of reducing the axial length of the turbocharger.

In an additional embodiment, the electric motor rotor assembly is configured having a pair of grooves disposed circumfrentially along an outside rotor surface, and positioned adjacent rotor axial ends. A ring seal is positioned in each respective groove and functions to form a leak-tight seal against respective motor and center housing surfaces to prevent the migration of oil into the motor housing. A pair of endplates are coupled to the shaft, and magnet is positioned between the two endplates and around the shaft. A magnet wrap surrounds the magnet. The endplates serve to axially enclose the magnet on the rotor, and to provide dynamic balance to the rotor assembly.

In another embodiment, the rotor assembly comprises an integral thrust washer disposed along one of its axial ends. The so-formed one-piece rotor and thrust washer is positioned axially against the bearing assembly to provide a thrust bearing surface thereagainst.

BRIEF DESCRIPTION OF THE DRAWINGS

The aspects of the present invention are more readily understood when considered in conjunction with the accompanying drawing and the following detailed description wherein.

DETAILED DESCRIPTION

Electric assisted turbochargers, constructed according to principles of this invention, comprise a motor stator, a motor housing, and center bearing housing that are together designed to minimize the overall turbocharger length. An axial end of the center housing is configured to fit within the motor housing. The electrical windings of the motor stator are asymmetrical, so that the windings on the axial side of the stator facing the center housing space creates a radial gap, between the rotor and the stator, that provides room for the center housing axial end to extend therein. The asymmetrical stator design enables placement of the axial end portion of the center housing within the motor housing, thereby allowing maximum bearing span/size for a given overall turbocharger length, and also provides more area for oil to drain from the bearing.

Figure 1:
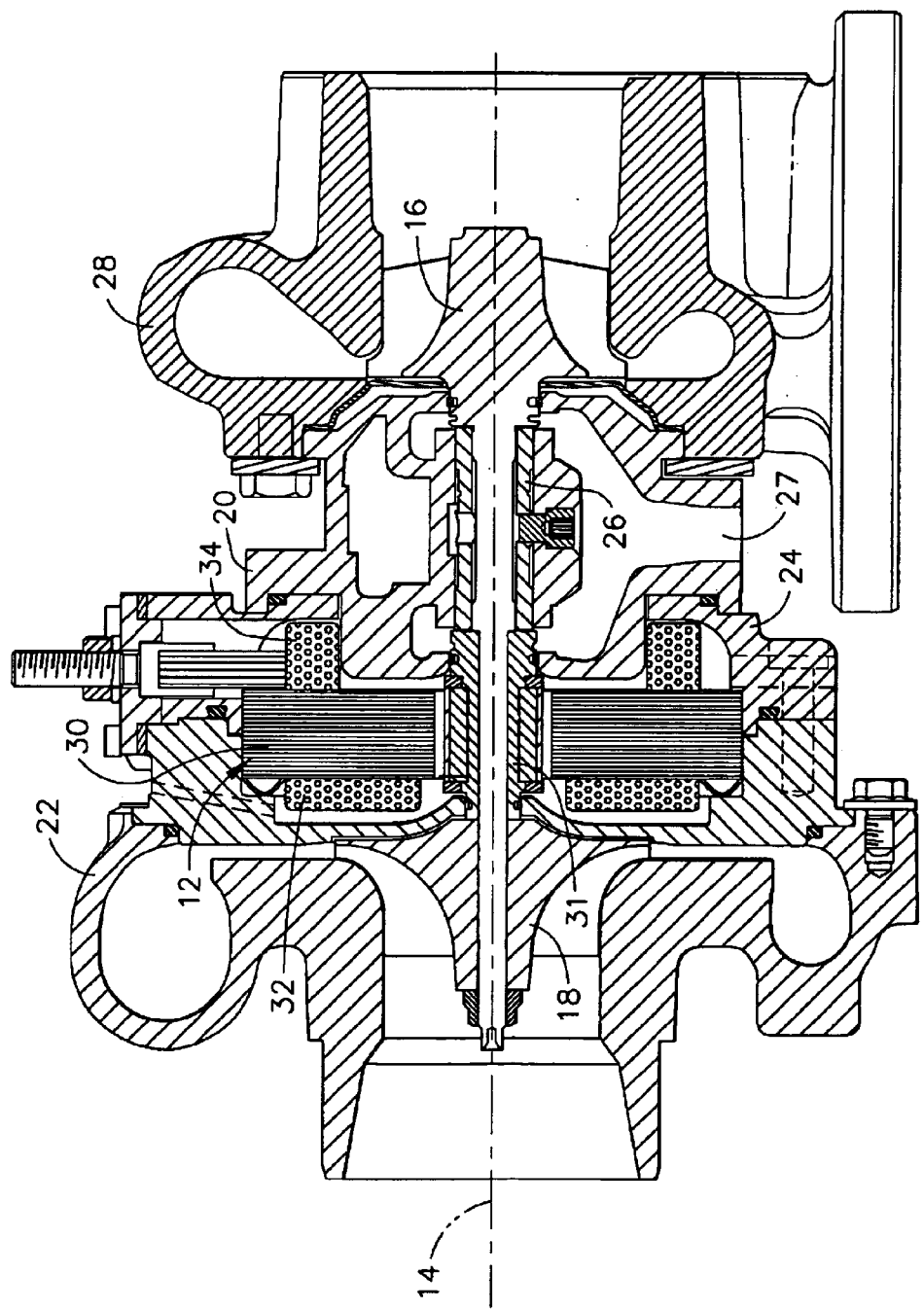
FIG. 1 is a cross section of an electric assisted turbocharger constructed according to an embodiment of the present invention.

As shown in FIG. 1, a turbocharger according to an embodiment of the present invention generally comprises an electric motor 12 that is disposed around a turbocharger shaft 14 that is common to both a turbine 16 and a compressor 18. The electric motor 12 is disposed within the turbocharger adjacent a center housing 20, and is interposed axially between the center housing 20 and a compressor housing 22 that houses the compressor 18.

Referring again to FIG. 1 in more detail, an example electric assisted turbocharger embodiment of this invention comprises (moving axially from left to right) the compressor 18 disposed within the compressor housing 22. To the right of and attached to the compressor housing 22 is a motor housing 24 that contains the electric motor 12. To the right of and attached to the motor housing 24 is the center or bearing housing 20. A bearing assembly 26 is shown disposed within the center housing 20 and positioned around the common shaft 14. Also disposed within the center housing is an oil drain area 27.

To the right of and attached to the center housing 20 is a turbine housing 28 that houses the turbine 16. Together, the motor housing 24 and the central housing 20 have a central opening extending axially from the compressor 18 to the turbine 16, or alternatively to a turbine and/or compressor backplate. The compressor 18 is attached to one end of the shaft 14, and the shaft projects through central openings of the compressor housing 22, motor housing 24, center housing 20, and turbine housing 28, and is attached at its opposite end to the turbine 16.

The electric motor, constructed according to an embodiment of this invention, comprises a stator assembly 30 mounted around a rotor assembly 31, which rotor assembly is attached to the turbocharger shaft 14. At one axial end of the motor, e.g., a left-hand side in FIG. 1, is a left-hand stator winding 32. At an opposite axial end of the motor, a right-hand side in FIG. 1, is a right-hand stator winding 34. As shown in FIG. 1, the left-hand stator winding 32 extends axially outwardly from the motor starting from a radial position closer to the rotor assembly 31 than does the right-hand stator winding 34. The radial gap in space between the rotor and the right-hand side winding 34 enables an axial end portion of the center housing 20 to extend a distance into the motor housing 24 between the right-hand stator winding 34 and the rotor assembly 31.

Constructed in this fashion, the left-hand stator winding 32 and right-hand stator winding 34 are understood to be asymmetrical. The asymmetric nature of the left-hand stator winding 32 and the right-hand stator winding 34 allows the center housing to enter the motor housing. The extension of the center housing into the motor housing is desired because it enables use of a larger sized bearing and permits increased oil flow in the central housing. Extension of the center housing into the motor housing also functions to minimize the overall length of the turbocharger.

Figure 2:
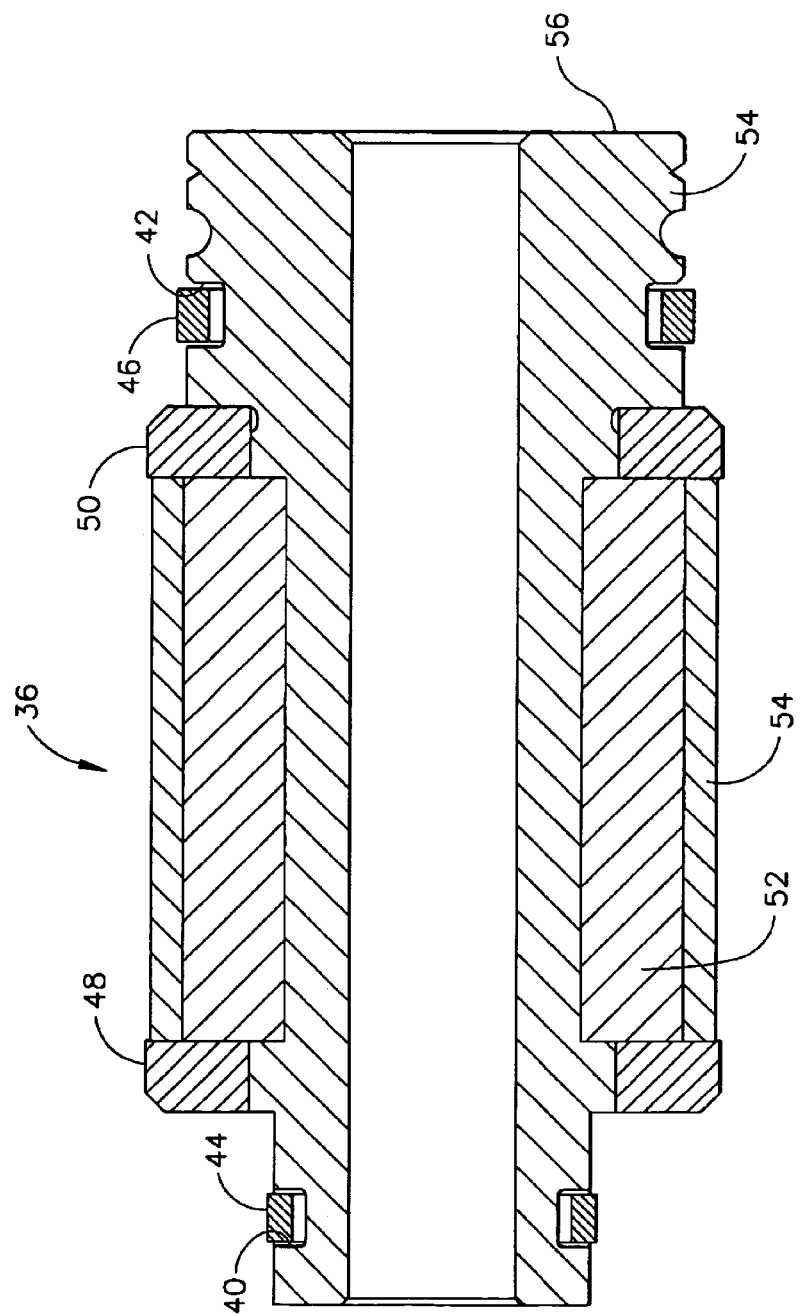
FIG. 2 is a cross section of a motor rotor assembly constructed according to an embodiment of the present invention.

In an additional embodiment of the present invention, as shown in FIG. 2, a motor rotor assembly 36 is constructed to both prevent oil contamination of the electric motor, and to balance the rotor of the electric motor. The motor rotor assembly 36 is part of the turbocharger rotating assembly, i.e., it rotates with the shaft, the compressor, and the turbine.

The rotor assembly comprises two piston ring grooves 40 and 42 that are disposed radially into the rotor outside surface adjacent rotor axial ends. Piston rings 44 and 46 are disposed within respective grooves 40 and 42, and are used to provide a seal with respective motor housing and center housing surfaces (as shown in FIG. 1) to prevent migration of oil and/or air to the electric motor. The rotor assembly further comprises two endplates 48 and 50 that are pressed onto the rotor assembly axially inwardly from the grooves and piston rings for the purpose of securing placement of one or more magnets to the rotor assembly.

One or more magnets 52 are mounted onto the shaft rotor assembly between the two endplates 48 and 50, and a magnet retainer 54 is mounted around the magnets between the two end plates. The endplates operate to prevent the magnets 52 and the magnet retainer 54 from moving axially along the rotor assembly surface. The endplates also serve as balancing elements for providing dynamic balancing to the rotor assembly. The magnet retainer 54 is preferably formed from a carbon material and is in the form of a carbon fiber wrap. The magnet retainer, however, can also be in the form of a metal or plastic sleeve.

In an additional embodiment of the present invention, the motor rotor 31 is configured to function as bearing thrust spacer, wherein the rotor assembly is constructed having a integral thrust spacer washer 54 disposed at a bearing-facing axial end. Configured in this manner, when disposed within the turbocharger, the rotor assembly functions to control axially-directed thrust loads from the bearing assembly (as shown in FIG. 1). Such integral rotor assembly and thrust spacer construction also creates a more axially stable assembly than can otherwise be achieved from a separate motor rotor and separate bearing thrust spacer. The integral assembly is more stable because of a reduction of mechanical interfaces. Additionally, the integral rotor/thrust spacer construction eliminates the need for tolerance control on the additional surfaces that have been eliminated. Features of the motor rotor, containing the permanent magnets for the motor, and the bearing thrust spacer are combined into a single piece installed onto the shaft of the rotating group of the electric assisted turbocharger.

Having now described the invention in detail as required by the patent statutes, those skilled in the art will recognize modifications and substitutions to the specific embodiment disclosed herein. For example, although the above description and drawings describe the electric motor as a permanent magnet motor, alternatively other types of electric motors can be used, such as induction motors or switched-reluctance motors. Furthermore, although the motor housing has been described as being sealed by two grooves in the rotor adjacent the compressor-side and turbine-side of the rotor respectively, and associated piston rings disposed in the grooves, alternatively the groove and piston on the compressor side can be eliminated. Additionally, while a wrap 54 has been described for retaining the magnet 52, alternatively other types of magnet retainers such as a steel sleeve shrunk-fit about the magnet could be used instead. Such modifications are within the scope and intent of the present invention.

What is claimed is:

1. An electric assisted turbocharger comprising:
   a center housing comprising a turbocharger shaft rotatably disposed therein that is rotatably carried on a bearing assembly;
   a turbine housing attached to the center housing and comprising a turbine disposed therein, the turbine being attached to one axial end of the turbocharger shaft;
   a compressor housing positioned at an end of the center housing opposite from the turbocharger housing, the compressor being attached to the other axial end of the turbocharger shaft;
   a motor housing interposed between the compressor housing and the center housing; and
   an electric motor positioned inside of the motor housing, the electric motor having a stator and a rotor, the rotor being coupled to the shaft, wherein the stator has a left-hand winding projecting outwardly from an axial end of the motor towards the compressor, and a right-hand winding projecting outwardly from an opposite axial end of the motor towards the center housing, wherein the left-hand winding extends radially a greater distance along the motor than that of the right-hand winding, and wherein the motor comprises a radial gap between the rotor and the right-hand winding; and
   wherein the center housing includes an axial end portion that projects inwardly into the motor housing into an area defined by the radial gap.

2. The electric assisted turbocharger as recited in claim 1, wherein the electric motor comprises an induction motor.

3. The electric assisted turbocharger as recited in claim 1, wherein the electric motor comprises a switched-reluctance motor.

4. The electric assisted turbocharger as recited in claim 1 wherein the rotor additionally comprises an integral thrust spacer in axial contact with the bearing assembly.

5. The electric assisted turbocharger as recited in claim 1 wherein the rotor additionally comprises:
   a groove defined in an outer surface of the rotor adjacent an axial end of the rotor that faces toward the turbine;
   a piston ring disposed within the groove in the rotor for forming a leak-tight seal with a surface of said axial end portion of the center housing;
   a pair of end plates coupled to the rotor adjacent rotor axial ends;
   a magnet positioned between the two end plates and coupled to the rotor shaft; and
   a magnet retainer surrounding the magnet.

6. The electric assisted turbocharger as recited in claim 5, wherein the rotor additionally comprises:
   a second groove defined in an outer surface of the rotor adjacent an opposite axial end of the rotor that faces toward the compressor;
   a second piston ring disposed within the second groove in the rotor for forming a leak-tight seal with a surface of a fixed structure of the turbocharger.

* * * * *